Sept. 14, 1943.                C. K. CORWIN                2,329,437
                             MEASURING DEVICE
                           Filed Aug. 14, 1941
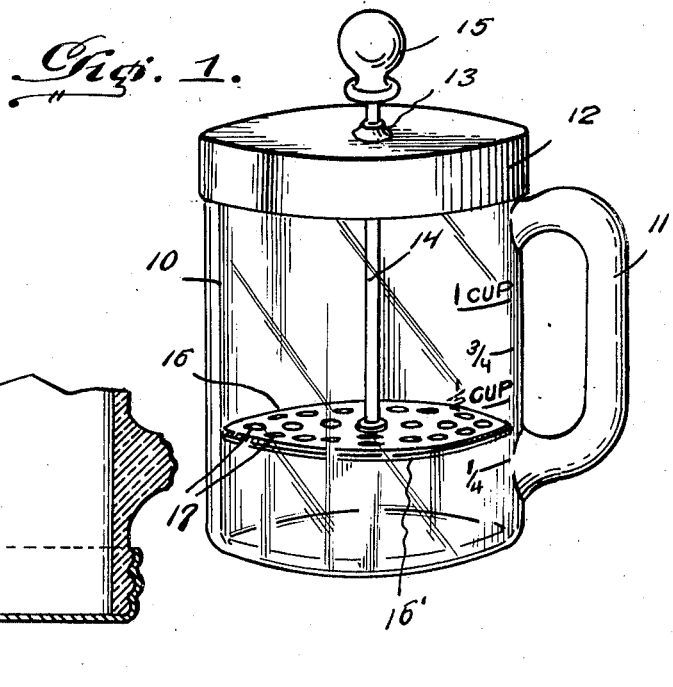
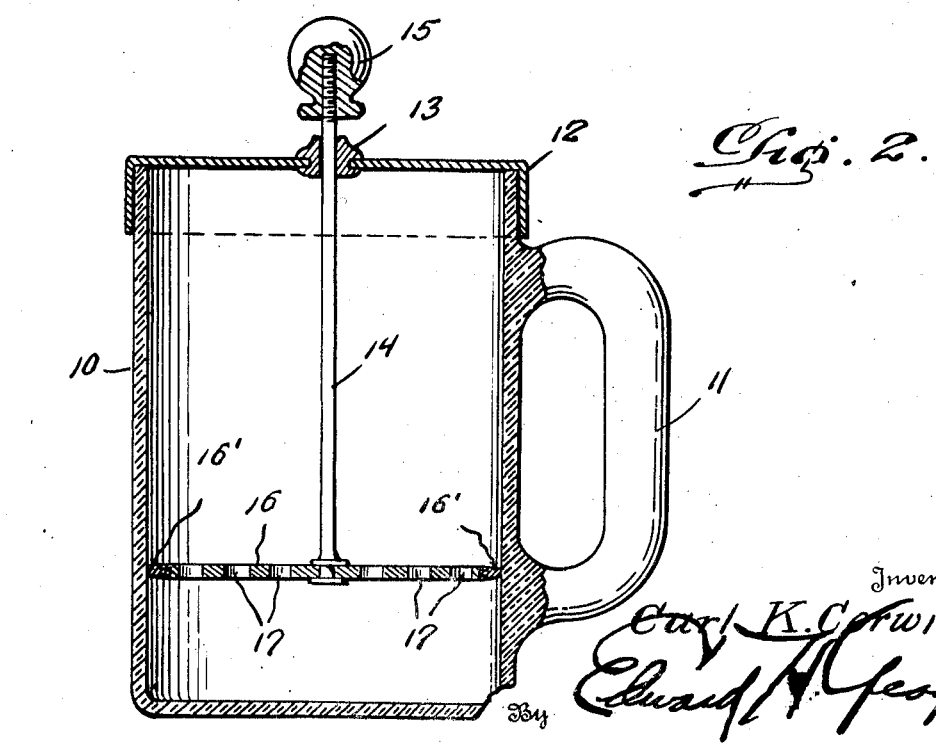

Patented Sept. 14, 1943

2,329,437

UNITED STATES PATENT OFFICE 2,329,437

MEASURING DEVICE

Carl K. Corwin, Aliquippa, Pa.

Application August 14, 1941, Serial No. 406,898

5 Claims. (Cl. 73—166)

The present invention comprehends the provision of a measuring device of novel construction, and while it is primarily intended for evenly and accurately measuring shortening material in a quick and easy manner, it is of course to be understood that its general use is contemplated by the claims.

One of the chief characteristics of the invention resides in the utilization of a plunger within a measuring receptacle for measuring the exact amount of the contents thereof desired for use.

Another important object of the invention resides in the use of a plunger for measuring the contents of the receptacle, and subsequently using the plunger for cutting off the excess material and removing it from the receptacle.

In carrying out the invention I also comprehend the use of a plunger for measuring the contents of the receptacle, and then using the plunger in the capacity of an ejector to completely remove the measured contents from the receptacle.

The nature and advantages of the invention will be better understood when the following detailed description is read in connection with the accompanying drawing, the invention residing in the construction, combination and arrangement of parts as claimed.

In the drawing forming part of this application like numerals of reference indicate similar parts in the several views, and wherein:

Figure 1 is a view in elevation of the invention, illustrating one embodiment thereof.

Figure 2 is a vertical sectional view therethrough.

Figure 3 is a fragmentary sectional view of a modified construction.

Referring to the drawing in detail 10 indicates a measuring receptacle, which may of course be constructed from any suitable material, and vary in size and configuration without departing from the spirit of the invention. The receptacle is however preferably made of glass and suitably graduated as shown. It is also preferably provided with a handle 11 although this may be eliminated. A removable cover 12 normally closes the receptacle and is provided with a centrally located bearing 13 through which a plunger rod 14 operates. The rod 14 is provided with a knob 15 which is preferably threaded thereon for convenience of removal as the occasion might require.

Carried by the rod 14 is a plunger 16 having perforations 17 which may vary in both size and number within the scope of the invention, while carried by the periphery thereof, in any suitable manner, is a molding of rubber or like material which contacts the inner wall of the receptacle 10. The plunger 16 is used in several capacities so that the contents of the receptacle can be evenly and accurately measured, and the excess material quickly and conveniently removed therefrom, thus leaving the exact amount desired for use within the receptacle. The measured or retained portion of the contents can of course be removed from the receptacle as desired, but in accordance with one embodiment of the invention plunger 16 is also employed in the capacity of an ejector for this purpose. The entire device is very simple in construction, and can be manufactured and sold at a very nominal cost.

In use of the invention, the cover and plunger are removed from the receptacle 10, and the material to be measured placed within the latter. Slightly more than the amount of the material desired for use is placed within the receptacle. The plunger is then inserted within the receptacle incident to replacing the cover thereon. The plunger 16 is now slightly depressed to register or align with the particular graduation on the receptacle indicative of the exact amount of the material desired for use.

Manifestly, by virtue of the pressure exerted on the contents of the receptacle, the excess material passes upwardly through the perforations 17 of the plunger. When the plunger is brought to rest it is then utilized to cut off the excess quantity of material and remove the same from the receptacle. In other words, after the plunger has been depressed to measure the contents of the receptacle, it is slightly rotated, whereupon the excess material reposes on the upper face of the plunger so that it can be conveniently removed by lifting the plunger out of the receptacle. Consequently, the exact amount of material desired for use remains in the receptacle and can be removed therefrom in any suitable manner as its use is desired. The device makes it possible to obtain an accurate measurement of materials, such as shortening, in a quick and convenient manner.

In accordance with one embodiment of the invention, the plunger 16 can also be used in the capacity of an ejector for the measured quantity of material, from the receptacle, especially such materials that have a tendency to cling to the wall of the receptacle. For this purpose, the receptacle may be provided with a removable bottom 18, preferably threaded on the receptacle as at 19, although these parts may be removably associated in any desired manner. In this connection, it will be obvious that after the plunger 16 has been lifted out of the receptacle to remove the excess material therefrom, it can be re-inserted within the receptacle and employed as an ejector to force the measured contents therefrom, subsequent to the removal of the bottom 18.

While it is believed that from the foregoing description the nature and advantages of the invention will be readily understood, I desire to have it known that I do not limit myself to what is herein illustrated or described, as such merely constitute embodiments of the invention, and that such changes may be resorted to when desired as fall within the scope of what is claimed.

I claim:

1. A measuring device for lard and materials of similar consistency including a graduated receptacle adapted to receive the material to be measured, and a perforated plunger slidable within the receptacle to measure the contents thereof by forcing the excess material through the perforations, said plunger being subsequently rotated to cut off the excess material and remove it therewith from the receptacle.

2. A measuring device for lard and materials of similar consistency including a graduated receptacle adapted to receive the material to be measured, a removable cover therefor, a perforated plunger slidably associated with the cover and operable within the receptacle to measure the contents thereof by forcing the excess material through the perforations, a rubber molding carried by the periphery of the plunger and contacting the wall of the receptacle, said plunger being adapted for rotation to cut off the excess material and cause it to repose upon the top of the plunger for removal therewith from the receptacle.

3. A measuring device for lard and materials of similar consistency including a graduated receptacle adapted to receive the material to be measured, a removable bottom therefor, a removable cover normally closing the receptacle, a perforated plunger slidably associated with the cover and slidable within the receptacle to measure the contents thereof by forcing the excess material through the perforations, and adapted to be subsequently rotated to cut off the excess material and remove it therewith from the receptacle, and said plunger being adapted to be subsequently used as an ejector for the contents of the receptacle with said bottom removed from the latter.

4. A measuring device for lard and materials of similar consistency including a receptacle having graduations thereon adapted to receive the material to be measured, a removable cover therefor, a plunger rod slidably and rotatably associated with the cover, a perforated plunger carried by the rod and slidable within the receptacle, said plunger cooperating with said graduations to measure the material by forcing the excess material through the perforations as the plunger is moved inwardly, and said plunger being subsequently rotated for use as a cutting element, whereupon the excess material is caused to repose on the top of the plunger for removal therewith from the receptacle.

5. A measuring device for lard and materials of similar consistency, including a receptacle adapted to receive the material to be measured, graduations on the receptacle, a plunger operable within the receptacle, a rubber molding surrounding the periphery of the plunger and contacting the wall of the receptacle, an operating rod for the plunger whereby the latter is capable of both sliding and rotating in the receptacle, said plunger having perforations through which the excess material passes as the plunger is slid inwardly to cooperate with the graduations for measuring the material, and said plunger being adapted to be subsequently rotated to cut off the excess material for removal with the plunger from the receptacle.

CARL K. CORWIN.